US006136448A

United States Patent [19]

Roth et al.

[11] Patent Number: 6,136,448

[45] Date of Patent: Oct. 24, 2000

[54] RECORDING MATERIAL FOR WATER-DILUTABLE INKS

[75] Inventors: Christoph Roth, Halle; Angela Kuhrt, Wolfen; Ursula Sell, Neukyhna-Pohritzsch, all of Germany

[73] Assignees: FEW Forschungs- und Entwicklungsgesellschaft Wolfen mbH, Wolfen, Germany; EMTEC Magnetics GmbH, Mü, Germany

[21] Appl. No.: 09/054,853

[22] Filed: Apr. 3, 1998

[30] Foreign Application Priority Data

Apr. 11, 1997 [DE] Germany .......................... 197 15 187

[51] Int. Cl.[7] .................................................... B32B 23/08

[52] U.S. Cl. ...................... 428/479.3; 428/412; 428/414; 428/480; 428/500; 428/508; 428/520; 428/524; 428/527; 428/532

[58] Field of Search .................................... 428/212, 195, 428/257, 412, 414, 481, 500, 508, 520, 524, 527, 532, 480, 483, 479.3

[56] References Cited

U.S. PATENT DOCUMENTS

| | | | |
|---|---|---|---|
| 4,503,111 | 3/1985 | Jaeger et al. | 428/195 |
| 4,555,437 | 11/1985 | Tanck | 428/212 |
| 4,680,235 | 7/1987 | Murakami et al. | 428/414.4 |

FOREIGN PATENT DOCUMENTS

| | | |
|---|---|---|
| 0 233 703 | 8/1987 | European Pat. Off. . |
| 0 233 703B1 | 8/1987 | European Pat. Off. . |
| 0 514 633 | 11/1992 | European Pat. Off. . |
| 0 524 626 | 1/1993 | European Pat. Off. . |
| 0 583 141 | 2/1994 | European Pat. Off. . |
| 0 379 964 | 6/1994 | European Pat. Off. . |
| 0 634 284 | 1/1995 | European Pat. Off. . |
| 0 482 837 | 3/1995 | European Pat. Off. . |
| 0 482 838 | 3/1995 | European Pat. Off. . |
| 30 24 205 | 6/1980 | Germany . |
| 44 05 969 | 8/1995 | Germany . |
| 37 07 627 | 4/1996 | Germany . |

*Primary Examiner*—Terressa Mosley-Boykin
*Attorney, Agent, or Firm*—Nields, Lemack & Dingman

[57] ABSTRACT

A recording material, more particularly for ink-jet printers, comprises an inking layer formulated to locally receive a water-soluble pigment solution and containing an epoxy cross-linkable, carboxyl-grouped cationic mixed polymer, an epoxidized metal oxide and a water-soluble polymer.

12 Claims, No Drawings

RECORDING MATERIAL FOR WATER-DILUTABLE INKS

The invention relates to a recording material for water-dilutable inks, more particularly for use with ink-jet printers, and a method for producing same.

Image recording and reproduction by means of ink-jet printers is a method in wide use since it permits direct and speedy conversion of electronic image data. Modern printing technology permits imaging with a resolution corresponding to the resolution in imaging in conventional silver halide photography employing greatly differing print media such as paper media or transparent films. The quality of the images, more particularly the resolution, depends on both the capabilities of the printer used and decisively on the properties of the recording material, it being the recording material which furthermore dictates handling and applicational possibilities of the finished images. The recording material needs to satisfy the following requirements: good inking to achieve high color density; low diffusion of the ink (dye solution) in the recording material to maintain the droplet size small and thus to achieve good contour acutance and resolution; fast drying and good smudge resistance after inking; low tack even at high air humidity; high transparency of the recording material when configured as a projection film; and low sensitivity to water and thus suitable for outdoor applications.

Conventional recording materials fail to come up to these requirements and are thus restricted in their application.

In the case of paper media recording materials, fast inking and smudge resistance is achieved by modifying an inking layer by high pigmentation (DE 3 024 205, EP 379 964), this resulting, however, in heavy clouding so that such modified recording materials are not suitable as projection films. It is known to provide inking layers of water-soluble polymers such as e.g. polyvinyl alcohol, polyvinylpyrrolidone, gelatine etc. (U.S. Pat. No. 4,503,111, U.S. Pat. No. 4,680,235, U.S. Pat. No. 4,555,432, DE 4 405 969). Under influence of humidity these polymers exhibit, however, high tack and lack of imperviousness to water. Employing cationic polymers as binding agents for fixing the pigments in an inking layer and to enhance smudge resistance is known from DE 3 707 624 or EP 514 633. Polymer blends of polyvinyl alcohol or polyalkyloxides with cationic polymers may also be employed (EP 379 964, EP 634 284, JP 56-84992, JP 59-20696).

Employing metal oxide sols as fillers is described in EP 524 626 and DE 4 405 969. To improve smudge resistance it is known to add silanes to the binding agent solutions to form matrix polymers (see EP 583 141, EP 482 837). To prevent sensitivity to water it is proposed in EP 233 703 to use acidic, water-insoluble polyacrylates and polyvinylpyrrolidones as the inking layer.

It is also known to produce 2-layer systems comprising a microporous polyvinyl acetate cover layer to improve smudge resistance. Due to this, however, the transparency is impaired so that an application as projection film is impossible. For film media it is thus proposed to cross-link water-soluble mixed polymers on the basis of acrylic acid or p-styrene sulfonic acid with polyfunctional aziridines (EP 482 838). This cross-linking has a negative effect on the drying time of the applied ink, however.

The known recording materials fail to satisfy the above requirements, they not being suitable, more particularly, for applications in which contact with moisture or water is possible, since pigment is extracted from the layer with swelling or dissolution of the inking layer (water-logging) so that the achieved inking densities are reduced and contour acutance is lacking.

It is the object of the invention to define a new recording (printing) material featuring improved resistance to moisture and water, and to define a method of producing same. More particularly, the intention is to provide a recording or printing material having a broader range of application and featuring practically acceptable drying times after inking.

This object is achieved by a material as set forth in claim 1 and a method as set forth in claim 8. Advantageous embodiments read from the sub-claims.

A recording or printing material in accordance with the invention comprises an inking layer (or ink recepting layer) containing an epoxy cross-linkable, carboxyl-grouped, cationic mixed polymer, a water-soluble polymer and an epoxidized metal oxide sol. The percentages by weight are preferably 30 to 60% by weight of the mixed polymer, 30 to 60% by weight of the metal oxide and 10 to 40% by weight of the water-soluble polymer in each case.

The epoxy cross-linkable, carboxyl-grouped, cationic mixed polymer has the structure formula:

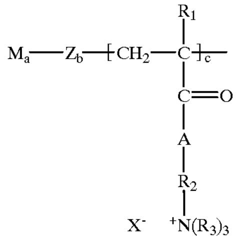

where

M: carboxylic acid monomer

Z: vinyl monomer

A: oxygen or nitrogen

R1: H, $CH_3$

R2: alkylene group of C2 to C8

R3: $CH_3$, $C_2H_5$, $C_3H_7$, $C_4H_9$

X: chloride, bromide, and a: 10 to 50 mol %, b: 0 to 20 mol %, c: 50 to 90 mol %.

Examples of such cross-linkable polymers having the cited general structure formula are:

Acrylic acid methacryloxyethyl-trimethyl ammonium chloride copolymers:

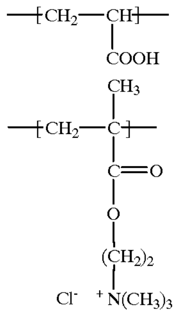

Acrylic acid ethylacrylate-methacryloxyethyl-trimethyl ammonium chloride terpolymers:

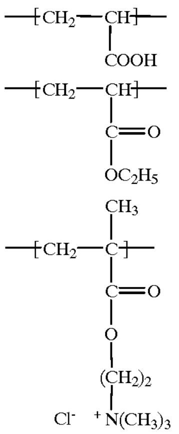

Acrylic acid methacrylamidopropyl-trimethyl ammonium chloride copolymers

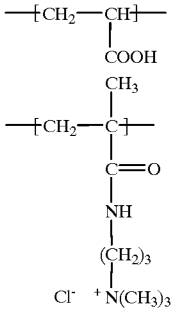

The components of the cross-linkable polymer may also contain a combination of various polymers according to the general structure formula.

As the carboxylic acid monomer module, acrylic acid, methacrylic acid or itaconic acid is preferred. In this case the percentages in the polymer component are preferably 20 to 35 mol %. In addition to ethylacrylate all known vinyl monomers, such as vinyl pyrrolidone, styrene, acryl amide or vinyl acetate may function as the comonomer module. The molecular weight of this polymer component is typically 10000 D to 500000 D.

The metal oxide sol component is produced in a known way by sol/gel technologies from epoxidized metal oxide sols with an organic solvent (e.g. methanol, ethanol)—see U.S. Pat. No. 3,955,035, H. I. Schmidt et al. "Non-Cryst. Solids" 80 (1989) 557. Preferably hydrolysates of epoxy silanes are employed. Examples of hydrolyzable epoxy silanes are:

glycidoxypropyltrimethoxysilane, glycidoxypropyltriethoxysilane, and (3,4 epoxycyclohexylethyltrimethoxysilane).

Hydrolysis and condensation can be implemented in the presence of tetraalkoxysilanes, alkyltrialkoxysilanes or diakyldialkoxysilanes, as a result of which the epoxy content of the metal oxide sol can be specifically controlled. In accordance with the invention metal oxide mixtures may also be employed, whereby alkoxylates of boron, aluminum or titanium function as the comodules in producing the sol.

In cross-linking the epoxy groups or in forming the gel (during drying) the epoxidized metal oxide sols react with the free carboxyl groups of the polymers and thus result in a water insoluble network of metal oxide and cationic polymer. To accelerate this reaction, epoxy catalysts can be additionally added to the composition.

Examples of epoxy catalysts are triethylamine, dimethylbenzylamine and N-methylimidazol. Their concentration relative to the epoxidized metal oxide sol is preferably 1 to 5% by weight.

The second water-soluble polymer component soluble is preferably a non-ionic or cationic polymer soluble in water. This can be formed, for example, by polyvinyl alcohol, polyvinylpyrrolidone, polyacrylamide, cationic polyacrylamide, cationic polyacrylester or combinations thereof.

The recording material in accordance with the invention may furthermore contain in the inking layer means for controlling film homogenity and surface tension. For this purpose more particularly non-ionic or cationic tensides are suitable, preference being given especially to hexadecyltrimethyl ammonium bromide.

The recording material in accordance with the invention may contain as the base a flexible base suitable for printing by an ink-jet printer. Paper or transparent plastic films are used preferably for this purpose. It is, however, also possible to use rigid or non-flexible materials such as plates of glass or plastics as the base. The base may be substantially flat or also in any shape, applying the inking layer being possible to any surfaces of the base. In conclusion, it is possible to produce the inking layer in such a thickness that a freely-carrying (unsupported) recording material is formed.

Producing a recording material in accordance with the invention is done by applying a coating solution for the formation of an inking layer on the base. Formulating the coating solution is done by preparing a metal oxide sol in accordance with the composition as cited above and adding the polymer components. Formulating is done preferably in aqueous-organic solvents, e.g. in a mixture of water and ethanol. Applying the coating solution to the base is done by a pouring technique as is known, for example, from photochemical coating techniques. As an alternative the base may also be coated by dipping, spraying or some similar method of application. Subsequently the coating solution is gelled on the base, this procedure possibly being accelerated by applying heat.

The recording material in accordance with the invention features the following advantages. The recording material contains a novel inking layer which is insoluble in water, forms no tacky surface in contact with moisture and features a practicable drying time. The inking layer is transparent and thus suitable for both paper and film base. The inking layer can be combined with known layers of conventional recording materials by employing the new inking layer as the cover layer. Following position-selective inking (pigment solution) the ink pigments are firmly anchored in the cross-linked polymer composition of the inking layer and are not bleached out by coming into contact with water. Due to this, using the recording material is not restricted to printing material for ink-jet printers, it instead also being suitable outdoors or in open air. There is no bleed of the ink droplets so that the recording material in accordance with the invention is suitable for recording techniques (printing processes) with high requirements on the resolution as in modern printing devices for producing overhead projector films or color prints of photographs.

Embodiments

EXAMPLE 1 (COMPARATIVE EXAMPLE)

With a 10% by weight solution of water and alcohol (40/60) a 7.8 $\mu$m thick layer having the following composition:

45% by weight gelatine (bone gelatine dissolved in alkaline)

35% by weight polyvinylpyrrolidone (K 90)

20% by weight epoxy-functional metal oxide sol, produced from 80% by weight tetraethoxysilane and 20% by weight glycidooxypropyl-trimethoxysilane is applied to a 100 μm thick base of polyester in a known way by means of a ductor pourer.

After drying the layer at 85° C. the film is printed by means of an ink-jet printer, type HP Descjet 690C. To characterize the properties the optical density is established, contour acutance (Crispness) visually appreciated and both transparency and tack of the surface assessed. Furthermore, for testing its resistance to water the film is brought into contact with flowing water for 30 min. at 25° C., after which the optical density and quality of the coating inspected. The results are as follows:

| | | |
|---|---|---|
| Contour acutance | good, after watering fuzzy | |
| Drying time | 7.5 min | |
| Surface quality (85% rh): | slightly tacky, heavy swelling in water contact | |
| Transparency | clear film. | |
| opt. density | D1 (before watering) | D2 (after watering) |
| (magenta) | 1.9 | 1.3 |
| (cyan) | 1.7 | 0.9 |
| (yellow) | 0.95 | 0.6 |

Coating not impervious to water. Pigment bleaches out and diffuses also in the coating.

EXAMPLE 2 (COMPARATIVE EXAMPLE)

Analogous to example 1 an 8.5 μm thick coating having the following composition:

35% by weight Na-polyacrylate

59% by weight polyacylic acid (cross-linked in the presence of silanes as per EP 583 141)

8% by weight metal oxide sol of tetraethoxysilane is applied.

The results are as follows:

| | | |
|---|---|---|
| Contour acutance: | good, after watering fuzzy | |
| Drying time: | 6.5 min | |
| Surface quality (85% rh): | non-tacky, coating swells heavily in water contact | |
| Transparency | clear film. | |
| opt. density | D1 (before watering) | D2 (after watering) |
| (magenta) | 1.1 | 1.1 |
| (cyan) | 1.4 | 0.4 |
| (yellow) | 0.6 | 0.3 |

Coating not impervious to water. Pigment diffuses in coating and is bleached out considerably.

EXAMPLE 3

Analogous to example 1 an 11.5 μm thick coating having the following composition:

45% by weight coplymer of acrylic acid and methacryloxyethyl-trimethyl ammonium chloride (20/80), molecular weight 130000 D, 45% by weight metal oxide sol, produced from 75% by weight tetraethoxysilane and 25% by weight glycidoxypropyltrimethoxysilane, and 10% by weight polyvinylalcohol (fully saponified, molecular weight 95000 D)

is applied.

The results are as follows:

| | | |
|---|---|---|
| Contour acutance: | good, even after watering | |
| Drying time: | 7.0 min | |
| Surface quality (85% rh): | non-tacky, coating non-tacky, insoluble in water contact | |
| Transparency: | clear film. | |
| opt. density | D1 (before watering) | D2 (after watering) |
| (magenta) | 1.9 | 1.85 |
| (cyan) | 1.6 | 1.5 |
| (yellow) | 0.9 | 0.9 |

The coating is impervious to water. No appreciable bleaching of pigment in contact with water. Crisp images reattained after drying.

EXAMPLE 4

Analogous to example 1 an 12.5 μm thick coating having the following composition:

55% by weight mixed polymer of acrylic acid/ethylacrylate/methacryloxyethyl-trimethyl ammonium chloride (28/12/60), molecular weight 140000 D, 35% by weight metal oxide sol of 50% by weight glycidoxypropyltriethoxysilane and 50% by weight tetraethoxysilane, and 10% by weight polyvinylpyrrolidone (molecular weight 320000 D)

is applied.

The results are as follows:

| | | |
|---|---|---|
| Contour acutance: | good, even after watering crisp images | |
| Drying time: | 7.0 min | |
| Surface quality (85% rh): | non-tacky, clear, non-tacky coating in water contact | |
| Transparency: | clear film. | |
| opt. density | D1 (before watering) | D2 (after watering) |
| (magenta) | 2.1 | 2.0 |
| (cyan) | 1.8 | 1.7 |
| (yellow) | 0.9 | 0.85 |

The coating is impervious to water. No appreciable bleach-out of pigment when watered. Crisp images reattained after drying.

EXAMPLE 5

Analogous to example 1 a 10.5 μm thick coating having the following composition:

48.5% by weight coplymer of acrylic acid and acrylamidopropyl-trimethyl ammonium chloride (35/65) (molecular weight 195000 D), 40% by weight metal oxide sol of 80% by weight tetraethoxysilane and 20% by weight glycidoxypropyltrimethoxysilane, 10% by weight poly-methacrylamidopropyl-trimethyl ammonium chloride (molecular weight 85000 D), and 1.5% by weight hexadecyltrimethylammonium bromide is applied.

The results are as follows:

| | | |
|---|---|---|
| Contour acutance: | good, even after watering crisp images | |
| Drying time: | 7.5 min | |
| Surface quality (85% rh): | non-tacky, even in water contact | |
| Transparency: | clear film. | |
| opt. density | D1 (before watering) | D2 (after watering) |
| (magenta) | 2.0 | 1.95 |
| (cyan) | 1.9 | 1.8 |
| (yellow) | 0.8 | 0.8 |

The coating is impervious to water. No appreciable bleach-out of pigment when watered. Crisp images reattained after drying.

As compared to conventional comparitive examples these examples exhibit high constant density even after water contact, dry, non-tacky surfaces and high transparency even after water contact and a repeat drying. The inking layer features a composition which is practically non-toxic.

What is claimed is:

1. A recording material comprising at least one inking layer, provided to receive a water-soluble pigment solution, wherein:

said at least one inking layer comprises an epoxy cross-linkable, carboxyl-grouped, cationic mixed polymer, an epoxidized metal oxide and a water-soluble polymer.

2. The recording material as set forth in claim 1 wherein the percentages by weight of said epoxy cross-linkable, carboxyl-grouped, cationic mixed polymer is 30 to 60% by weight, of said epoxidized metal oxide is 30 to 60% by weight and of said water-soluble polymer is 10 to 40% by weight.

3. The recording material as set forth in claim 1 or 2, wherein said epoxy cross-linkable, carboxyl-grouped, cationic mixed polymer has the structural formula:

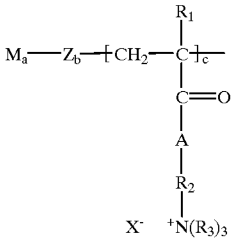

wherein

M: carboxylic acid monomer

Z: vinyl monomer

A: oxygen or nitrogen

R1: H, $CH_3$

R2: alkylene group of C2 to C8

R3: $CH_3$, $C_2H_5$, $C_3H_7$, $C_4H_9$

X: chloride, bromide, and a: 10 to 50 mol %, b: 0 to 20 mol %, c: 50 to 90 mol %.

4. The recording material as set forth in claim 1 or 2, wherein said at least one inking layer further comprises means for controlling the consistency and surface tension thereof.

5. The recording material as set forth in claim 1 or 2, wherein one of said at least one inking layer is connected to a base.

6. The recording material as set forth in claim 5 wherein said base is a transparent plastics film or paper.

7. A print medium for ink-jet printers comprising the recording material as set forth in claim 1 or 2.

8. A method of producing a recording material containing at least one inking layer, provided to receive a water-soluble pigment solution, comprising the steps:

producing a coating solution of an epoxy cross-linkable, carboxyl-grouped, cationic mixed polymer, an epoxidized metal oxide and a water-soluble polymer;

applying said coating solution to a base; and gelling and drying said coating solution to form said inking layer.

9. The method as set forth in claim 8 wherein an epoxy catalyst is added to said coating solution.

10. The method as set forth in claim 8 or 9 wherein applying said coating solution is done by pouring it onto a plastics film or a paper base.

11. The recording material as set forth in claim 3, wherein said at least one inking layer further comprises means for controlling the consistency and surface tension thereof.

12. The recording material as set forth in claim 3, wherein one of said at least one inking layer is connected to a base.

* * * * *